US008806177B2

(12) United States Patent
Krieger et al.

(10) Patent No.: US 8,806,177 B2
(45) Date of Patent: Aug. 12, 2014

(54) PREFETCH ENGINE BASED TRANSLATION PREFETCHING

(75) Inventors: Orran Y. Krieger, Newton, MA (US); Balaram Sinharoy, Poughkeepsie, NY (US); Robert B. Tremaine, Stormville, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/482,222

(22) Filed: Jul. 7, 2006

(65) Prior Publication Data

US 2010/0250853 A1 Sep. 30, 2010

(51) Int. Cl.
*G06F 12/00* (2006.01)
(52) U.S. Cl.
USPC .......................................................... 712/207
(58) Field of Classification Search
CPC .............................. G06F 12/10; G06F 12/1027
USPC .......................................................... 712/207
See application file for complete search history.

(56) References Cited

U.S. PATENT DOCUMENTS 4,710,866 A * 12/1987 Zolnowsky et al. .......... 712/207
5,113,515 A 5/1992 Fite et al.
5,835,967 A * 11/1998 McMahan ..................... 711/213
6,138,212 A 10/2000 Chiacchia et al.
6,175,898 B1 * 1/2001 Ahmed et al. ................. 711/137
6,327,607 B1 * 12/2001 Fant .............................. 709/201
6,415,356 B1 7/2002 Chaudhry et al.
6,438,656 B1 8/2002 Arimilli et al.

OTHER PUBLICATIONS

Patterson, David. Hennessy, John. "Computer Architecture: A Quantitative Approach". Morgan Kaufmann Publishers, Third Edition. 2003. pp. 438-440, 466-470, and 485.*
Foldoc, "cache" definition. 2 Pages, Jun. 25, 1997.*
Gao et al. "Improving TLB Performance". May 11, 1998. 19 pages.*

* cited by examiner

*Primary Examiner* — Robert Fennema
(74) *Attorney, Agent, or Firm* — Scully, Scott, Murphy & Presser, P.C.; Daniel P. Morris, Esq.

(57) ABSTRACT

A method and system for prefetching in computer system are provided. The method in one aspect includes using a prefetch engine to perform prefetch instructions and to translate unmapped data. Misses to address translations during the prefetch are handled and resolved. The method also includes storing the resolved translations in a respective cache translation table. A system for prefetching in one aspect includes a prefetch engine operable to receive instructions to prefetch data from the main memory. The prefetch engine is also operable to search cache address translation for prefetch data and perform address mapping translation, if the prefetch data is unmapped. The prefetch engine is further operable to prefetch the data and store the address mapping in one or more cache memory, if the data is unmapped.

20 Claims, 4 Drawing Sheets

PREFETCH ENGINE BASED TRANSLATION PREFETCHING

STATEMENT REGARDING FEDERALLY SPONSORED RESEARCH OR DEVELOPMENT

This invention was made with Government support under Contract No.: NBCH020056 (DARPA) awarded by Defense, Advanced Research Projects Agency. The Government has certain rights in this invention.

FIELD OF THE INVENTION

The present disclosure generally relates to computer processors and particularly to memory management.

BACKGROUND OF THE INVENTION

Cache memory is one of the critical elements in computer processors for achieving good performance on the processors. Generally, a cache is a smaller, faster memory used by a central processing unit of a computer to reduce the average time to access its main memory. The cache typically stores copies of the data from the most frequently used main memory locations. The fundamental idea of cache organization is that by keeping the most frequently accessed instructions and data in the fast cache memory, the average memory access time will approach the access time of the cache. A cache miss is costly because the data must then be fetched from a higher-level cache, main memory, or potentially another processor's cache on a multiprocessor, which incurs a delay since accessing the other memory is slower than accessing the cache memory. Thus, maximizing the cache's hit rate is one of the important factors in achieving good performance.

An important mechanism used to enhance the performance of cache is data prefetching. Data prefetching generally refers to the moving of data from memory to cache in anticipation of future accesses by the processor to the data, so as to hide memory latency. That is, data prefetching requests data from the memory subsystem prior to when the data is needed. If the correct data can be prefetched early enough, then the high latency of main memory can be hidden. Because microprocessors tend to be much faster than the memory where the program or data is kept, the program's instructions or data cannot be read fast enough to keep the microprocessor busy. By prefetching, the processor has the data from the memory before it will need it. In this way, the processor will not need to wait for the memory to provide its request.

There are several difficulties encountered in trying to design a successful prefetch strategy. Many of the difficulties involve having to determine which data should be prefetched. Previous work both in hardware and in software has investigated how to determine the correct data to prefetch. Other related questions include when or how early to prefetch the data. For instance, even if the correct data is prefetched, if it is prefetched too early, the prefetched data may be evicted before it actually gets a chance to be used. Additional questions involve how much of the data to prefetch, for example, because prefetching too much data places contention on the memory system.

There are, however, other problems compounded partly by the above-described difficulties. One problem that arises is the amount of time taken away from the main processor in determining what to prefetch. Another problem is requesting data that is not mapped in the TLB (translation lookaside buffer), SLB (segment lookaside buffer), or ERAT (effective-to-real address translation cache), or the like. Briefly, the TLB is a cache in a CPU (central processing unit) that contains parts of the page table, which translate from virtual into real addresses. The TLB improves the speed of virtual address translation because it stores or caches the translated virtual to physical address mapping. Typically, the search key is the virtual address and the search result is the corresponding physical address. If the search yields a match the virtual to physical address translation is known and the searched result data is used. If there is no match, the translation using the page table needs to be performed. This translation typically takes additional cycles to complete. Similarly, an SLB contains segment translations. Likewise, an ERAT is used to handle instruction-address translation and typically contains entries that map effective address for a page to its corresponding real address in memory.

Generally, the tables such as the TLB, SLB, and ERAT as described above, are caches of recent virtual-to-physical mappings used to accelerate address translation. In the existing prefetch methods, a prefetch is dropped if its virtual address does not match an entry in the cache tables such as the TLB because a fault handler must be run, which is an expensive operation. Thus, conventional prefetching methods have not addressed the problem of unmapped data access. Accordingly, what is needed is an efficient and reasonably accurate method for prefetching data that would reduce the processing load of the main processor. A prefetching method that is able to handle unmapped data is also desirable.

BRIEF SUMMARY OF THE INVENTION

A method and system for translation prefetching are provided. The method in one aspect includes instructing a prefetch engine to prefetch data, the prefetch engine being a separate processor from a main processor. The method also includes searching one or more cache translation entries for a prefetch data mapping corresponding to the prefetch data. The step of searching is performed by the prefetch engine. The method further includes performing address mapping translation, if the prefetch data is unmapped. The prefetch engine prefetches data and may store the address mapping in a respective translation table, if the data is unmapped.

A system for translation prefetching in one aspect includes a main processor, a main memory, one or more cache memories, one or more translation caches, and a prefetch engine. A prefetch engine is operable to receive instructions to prefetch data from the main memory or other processor's cache. The prefetch engine is further operable to search one or more cache translation entries for a mapping corresponding to the prefetch data and perform address mapping translation, if the prefetch data is unmapped. The prefetch engine is also operable to prefetch the data, and store the address mapping in the one or more cache memory, if the data is unmapped.

In another aspect, a system for translation prefetching includes a main processor and a prefetch engine operable to at least carry out one or more instructions to prefetch data for the main processor to use. The prefetch engine is further operable to at least tag a prefetch request for unmapped data. An interrupt vector dedicated to unmapped prefetch requests is generated when a prefetch is to unmapped data, and in response to the interrupt vector, unmapped data's address is translated and the unmapped data is prefetched into a cache location. The unmapped data's address translation is stored in one or more respective cache translation buffers.

Further features as well as the structure and operation of various embodiments are described in detail below with ref-

DETAILED DESCRIPTION

Figure 1:
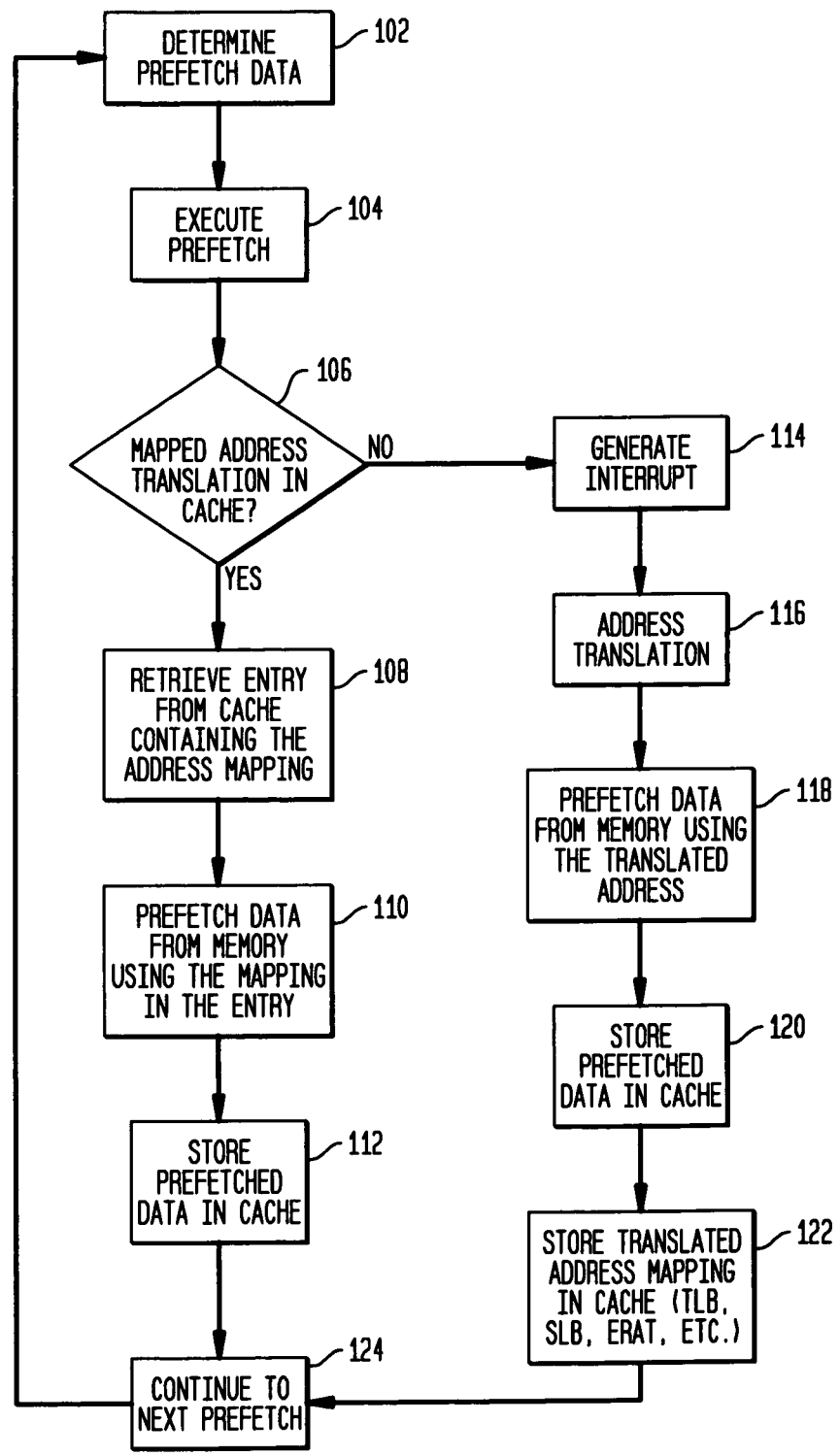
FIG. 1 is a flow diagram illustrating a method for prefetching data using a prefetch engine in one embodiment of the present disclosure.

FIG. 1 is a flow diagram illustrating a method for prefetching data using a prefetch engine in one embodiment of the present disclosure. At 102, it is determined to prefetch data and what data is to be prefetched. A compiler for example may determine data to prefetch and submit instructions to a prefetch engine for performing prefetch operations. In addition, the compiler may run its prefetch algorithm threads on the prefetch engine to determine what data to prefetch. The hardware may also insert data to be prefetched by the prefetch engine. Alternatively, the prefetch data may be generated by the prefetch engine itself due to speculative execution. A prefetch engine in an exemplary embodiment performs its processing independent of the main processor's activities. In this way, the main processor need not sacrifice its processing time and resources prefetching data. In one embodiment, a prefetch engine may be a co-processor or an auxiliary processor that is incorporated with a system memory controller to process threads that are offloaded from the primary application processors to assist, for example, in data organization, prefetch and off-load processing.

At 104, the prefetch engine executes a prefetch instruction. The prefetch engine searches the cache that contains address translation entries for the instruction or data it is to prefetch. Examples of the cache containing address translation entries include but are not limited to TLB, SLB, and ERAT. At 106, if the entry is present in the address translation cache, the mapped address is retrieved at 108. The address is then used to read the data from the physical memory at 110. At 112, the prefetched data is stored in cache memory where the main processor or the CPU or the like may access it to execute its instructions.

On the other hand, if there is no address translation entry in the cache for the prefetch data 106, an interrupt is generated to handle the fault at 114. At 116, in response to the interrupt, an address translation takes place. At 120, the prefetched data is stored in the cache memory for the main processor to access. In addition, the address translation, that is, the calculated address mapping for the prefetch is stored in a respective address translation caches such the TLB, SLB, ERAT, or the like at 322. The processing then continues to the next prefetch at 124.

In one embodiment of the present disclosure, at 106, the prefetch data that causes a fault or miss in the address translation tables may be tagged, for example, by the prefetch engine's hardware. When an interrupt is generated to handle the fault, the processor handling the interrupt knows which prefetch caused the fault and would handle it appropriately.

Figure 2:
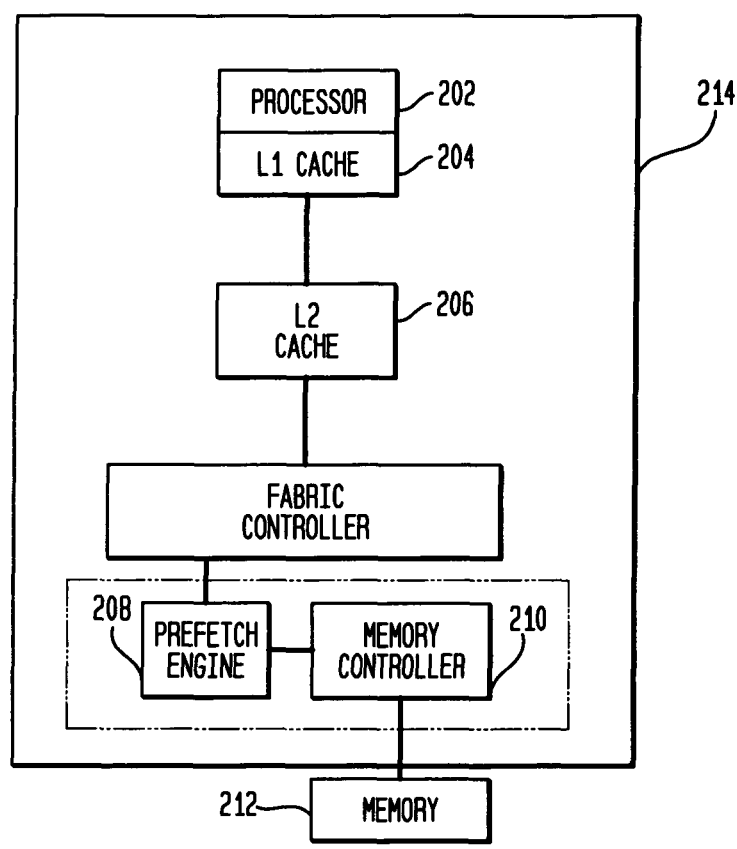
FIG. 2 is a block diagram illustrating an example of the prefetch engine architecture in one embodiment of the present disclosure.

FIG. 2 is a block diagram illustrating an example of the processor architecture having a prefetch engine in one embodiment. FIG. 2 shows a single main processor and a single prefetch engine for illustrative purposes only. Different number of processors or configuration is possible. In one embodiment of the present disclosure, main processor 202, memory controller 210 and prefetch engine 208 may share the same processor chip 214. Main processor 202, for example, may be a superscalar with two levels of caches 204, 206 as shown. A main processor 202 generally contains the hardware components for processing instructions and data, and implements the various data processing tasks of a computer. For example, the main processor may have various combined digital functions, registers, ALU (arithmetic and logic unit), multiplexers, and decoders, etc. The main processor 202 may be a microprocessor enclosed in one integrated circuit (IC) package functioning as a CPU for a general purpose computer and/or as a processor unit in a special-purpose dedicated systems. Cache memory 204, 206 stores cached data and address translations such as the TLB, SLB, and/or ERAT, or the like, which the main processor 202 accesses for its processing.

In an exemplary embodiment, a prefetch engine, 208 may be a simple core that resides near the memory interface 210 on a chip with the main processor 214. A prefetch engine 208 may be a general purpose processor that is easily programmable and may have multi-threaded processing capabilities. The prefetch engine 208 in one embodiment is incorporated with the system memory controller 210 to process threads that are offloaded from the primary application processors to assist in data organization, prefetch and offload processing. In one embodiment, the prefetch engine incorporated in the memory subsystem provides a heterogeneous computing complex together with the processor array to offload a significant amount of processing around the memory system.

In one embodiment of the present disclosure, one or more prefetch engines 208 reside between the main processor cache hierarchy 204, 206 and the main memory controller hardware 210, for processing threads. The prefetch engine 208 in one embodiment maintains its own memory and buffer in lieu of a conventional cache memory structure to execute and manage its threads. Thus, in one embodiment, the prefetch engine's threads are not executed or managed in the system main memory. Applications or threads (such as compilers and operating system) running on the main processor 202 may submit instructions to the prefetch engine 208, and the prefetch engine 208 is enabled to run its threads in parallel to the main processor 202.

The prefetch engine 208 in one embodiment enhances programming productivity and system runtime performance by carrying out data prefetch to cache memory without disrupting main processor behavior. In an exemplary embodiment of the present disclosure, the prefetch engine 208 receives instructions from compilers or the operating system to prefetch data and resolves page faults and address translations. For example, in conventional processing, the main processor stalls each time a pointer to a data reference needs to be fetched from memory (cache miss). However, when compiler creates a thread that is sent earlier to a prefetch engine, the prefetch engine performs the pointer chasing activity, leaving the pointers and data in the main processor's cache memory for fast access when needed.

In one embodiment, the prefetch data which the prefetch engine 208 fetches may be simply the next instruction in the program. The prefetch data also may be part of a branching route taken as a result of branch prediction algorithm, where the prefetch engine 208 tries to anticipate the result of some calculation and fetch the right instructions in advance. A compiler, for example, parsing application data graph may generate memory references before a data dependency to facilitate fetching the data before it is required. The prefetch engine architecture in one embodiment provides a means for the compiler to initiate speculative prefetch activity, and imply which level of the cache data should be deposited in, for instance, based on probability of utilization. The prefetch engine 208 provides prefetching capabilities that allow placing data when and where needed in the cache hierarchy. Any of the known or will-be-known methods may be utilized to determine what data to prefetch.

In one embodiment, the prefetch engine 208 looks up the cache 204, 206 such as the TLB, SLB, or ERAT or the like, containing the address translations to retrieve a physical address in the memory 212 that maps to the virtual address of the prefetch. The memory 212, for instance, may be DRAM or the like. If there is a match, the mapped address is used to retrieve that data from the memory 212. The data is then stored in a fast cache memory 204, 206 for the main processor 202 to access so that, for example, a cache miss is reduced. On the other hand, if a fault occurs, for example, there is no virtual to physical address translation, that address needs to be resolved. In one embodiment of the present disclosure, an interrupt vector dedicated to a fault occurring in caches storing address mappings is established. When there is no match in the cache translation tables (for example, TBL, SLB, ERAT or the like), the prefetch request is tagged and the interrupt vector is generated. In response to the interrupt vector, the prefetch engine 208 performs the address translation. Then, using the translated address, the data is prefetched from the memory 212 and stored in cache such as shown at 204, 206. In addition, the translated address mapping is stored as an entry in one or more of the cache address translation tables such as the TLB, SLB, ERAT or the like.

In one embodiment of the present disclosure, the prefetch engine 208 may be placed on the main processor chip. In another embodiment, the prefetch engine 208 may be located outside the main processor chip near the memory 212. In one embodiment, the logical location of the prefetch engine 208 between the cache hierarchy 204, 206 and main memory 212 allows commands to the prefetch engine 208 from main processor(s) 202 to bypass the cache hierarchy, without polluting the caches and without suffering unnecessary delays traveling through the cache controllers.

Figure 3:
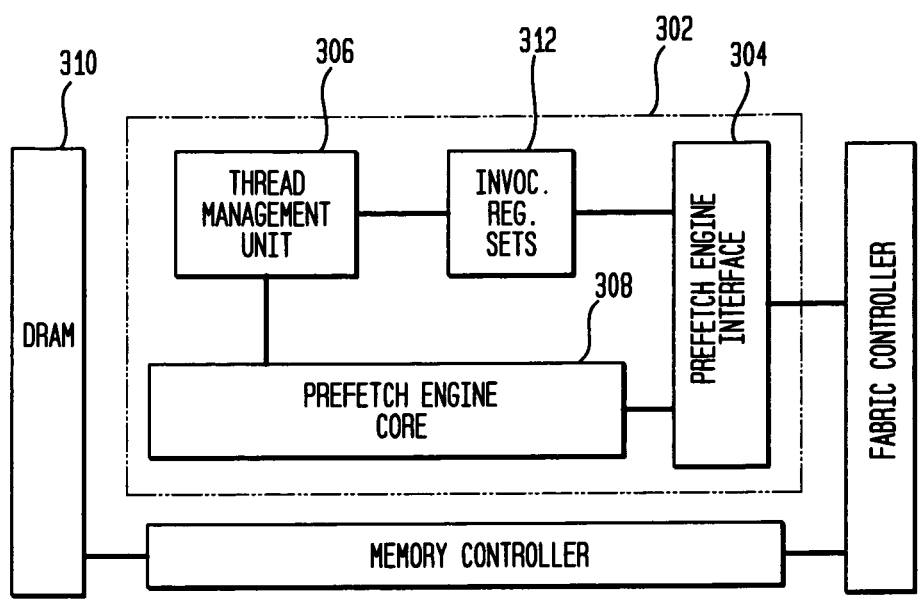
FIG. 3 is a block diagram illustrating an example of the prefetch engine organization in one embodiment of the present disclosure.

FIG. 3 is a block diagram illustrating the organization of the prefetch engine in one embodiment of the present disclosure. This architectural organization is provided for illustrative purposes only. Other configurations and variations are possible. The dashed box 302 encloses the prefetch engine in one embodiment. In one embodiment, the prefetch engine interface 304 provides an interface for the prefetch engine to communicate with the rest of the system. In one embodiment, the main processor(s) communicate with the prefetch engine 302 via the invocation register sets 312. For requests arriving from a main processor, the thread management unit 306 creates a thread and inserts it into the prefetch engine's job queue.

The prefetch engine core 308 may be a simple core and may include fast storage area memory (e.g., scratchpad memory). It may comprise hardware components such as scalar functional units, vector functional units, a set of general-purpose and control registers, and a bit matrix register to permute the bits within a word for executing instructions. Threads running on the prefetch engine 308 may share the scratchpad memory. In addition, they can access any main memory location in the machine. In one embodiment, accesses of the prefetch engine 302 to the main memory 310 may be handled the same way as accesses by the main processor are handled. For instance, they may be broadcast on the coherence fabric and snooped by caches in the system.

In one embodiment, the prefetch engine 302 works coupled with the main processor. For example, the main processor triggers a prefetch engine processing by storing an invocation packet into one of the invocation register sets 312, which for example are memory mapped in the main processor's address space. In one embodiment, the packet is moved immediately into a queue, clearing the register for a new invocation from the same process. The invocation packet may include a pointer to the function to invoke and a pointer to its arguments. The pointer to the arguments may include a completion flag currently initialized to zero. The main processor can then regularly poll the completion flag or can choose to be interrupted when the data is available. The prefetch engine 302 signals completion by setting the completion flag. In one embodiment, threads may be created by processes running on a main processor using a system call that returns a handle, for instance, a pointer to an invocation register set. A code running on the main processor may invoke a function on the coprocessor; the invocation specifies the thread to run this function, a pointer to the function, and arguments.

The prefetch engine 302 in one embodiment may be a small simultaneous multi-thread processor that executes, for example, fixed length threads from an associated thread queue. The prefetch engine 302 may be specified to run asynchronously or synchronously. Asynchronous threads run and complete without any notification to the requesting agent. Synchronous threads run and complete with notification of thread identifier (ID) and completion status. This status is transferred to the requesting agent. A requesting agent may be any device or means that can enqueue a thread and may include main processor threads running a compiler, operating system, library functions, etc. A requesting agent may also include scalability port interface control unit enqueuing threads.

In one embodiment, the prefetch engine 302 can prefetch addresses into the L3 cache. In one embodiment, prefetching is cache coherent and relies on the cache replacement protocol as though it were a surrogate main processor. The prefetch engine 302 fetches successive addresses at a specified stride or index into the L3, L2, or L1 or remote L3 cache. The new addresses may replace existing cache lines according to the cache replacement protocol. In one embodiment, there may be two main classes of memory-side prefetching: strided (which includes sequential) and correlation-based (where the sequence of misses observed in the past are recorded and used for future prefetches when the miss that leads the sequence is seen again).

Figure 4:
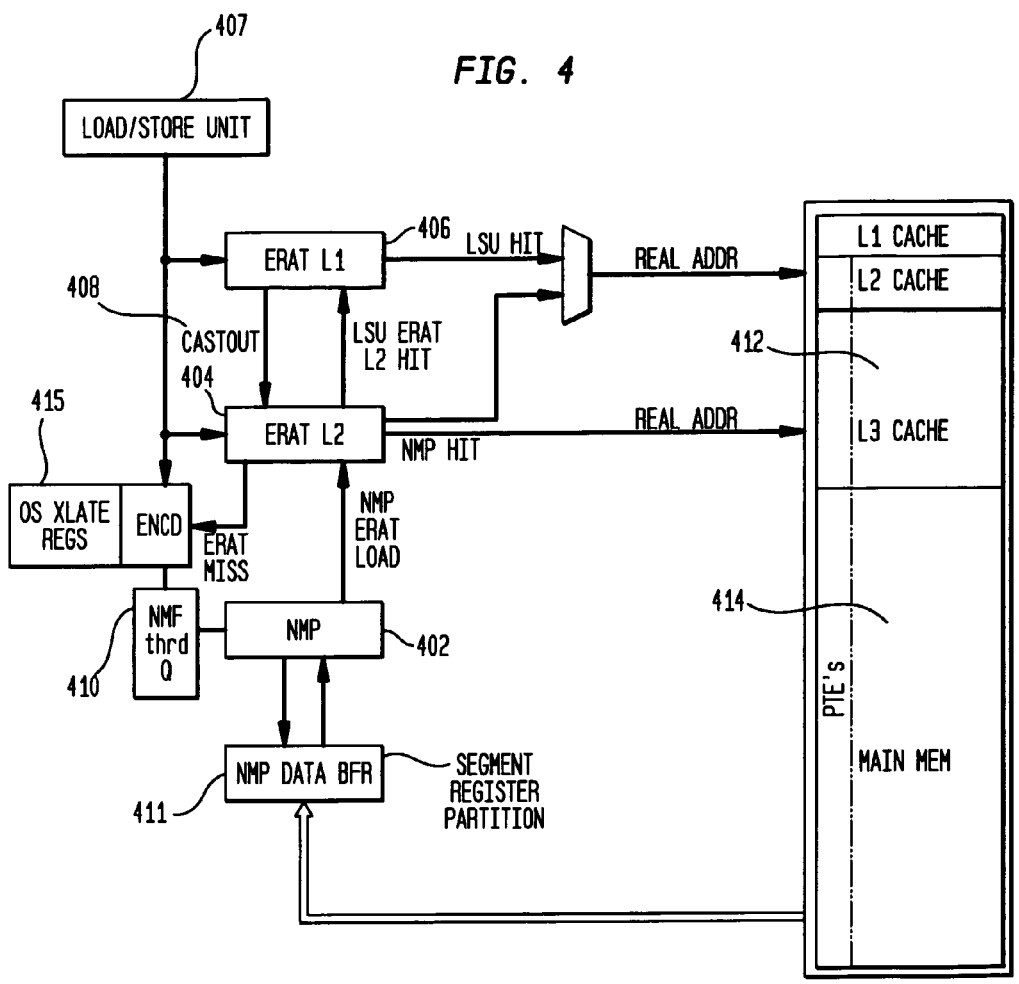
FIG. 4 is a block diagram illustrating multi-level address translation architecture in one embodiment of the present disclosure.

The prefetch-engine of the present disclosure in one embodiment is enabled to handle more than a single level of cache translation table. FIG. 4 is a block diagram illustrating multi-level address translation architecture in one embodiment of the present disclosure. A multi-level, for example, two-level translation table structure in one embodiment includes a first address translation table 406 that is small and enabled to maintain fast access. A second address translation table 404 is also provided. The second address translation table may be a slower but larger table that backs the first table 406. On current architectures, for example, the ERAT is a small fast translation cache that caches combinations of entries from the TLB and SLB translation caches. FIG. 4 illustrates two levels of ERATs, where the first 406 is a fast translation cache supported by a slower larger ERAT 404, that can be used for example a victim cache of entries from 406. In one embodiment, address translations generated by the prefetch engine 402 are stored in the L2 ERAT 404 for later reference by the prefetch engine 402 or by the L1 ERAT 406. The second level ERAT can either be used in a conventional manner as described in current architectures thereby interacting with the prefetch engine to allow entries to be added to ERAT during prefetches. An alternative embodiment allows the second-level ERAT to be used in addition as a victim cache allowing entries evicted from the first-level to be placed there and potentially to interact with the prefetch engine should that engine on a prefetch use a particular translation that has been marked as a victim in the second-level ERAT.

In one embodiment of the present disclosure, a second level TLB 404 supports virtual address translation for the prefetch engine. In addition, the prefetch engine may be used as a virtual memory management assist engine to an operating system program. A first level (L1) translation look aside table (TLB) 406 comprises a small (for example, 64 or 128 entries) high speed memory containing recently used mapping for program virtual page addresses, for instance from the processor load/store unit 407, to real memory page frame addresses. A second level (L2) TLB 404, larger (for example, 256 or 512 entries) than the first level TLB 406 is managed as a victim cache for L1 TLB 406 castout entries, and recent translation entries used by the prefetch engine 402. This structure enables the prefetch engine to pre-load page table entries into the L2 TLB 404 to mitigate page faults during program execution, but without displacing potentially more temporally relevant entries in the smaller L1 TLB 406. The ratio of castout L1 TLB entries to prefetch entries can be specified or allowed to float based on utilization.

When a program virtual memory page address is not found in the TLB 406, the virtual page address is first compared to those valid pages in the L2 TLB 404. If the page address is found in the L2 TLB 404, then the page is used to form the real address and the page entry is copied to the L1 TLB 406, replacing for example a least recently used entry which is used to replace a least recently used entry in the L2 TLB 404. When the program virtual page number is not found in either TLB 404 or TLB 406, a page fault occurs, requiring operating software or hardware to produce the mapping to satisfy the request at additional latency. In cases where both the processor load store unit 407 and the prefetch engine 402 have recently used the same virtual page address, then both TLBs 404, 406 may have the same entries.

In one embodiment, the prefetch engine 402 can have one or more program sequences or "micro threads" stored in memory or a buffer 410 for directing the prefetch activity. In another embodiment, the same buffer 410 may have one or more specific micro-threads initialized by an operating system program to service page faults from either the TLBs 440, 406, as an assist engine to an operating system program. In one embodiment, operating system program configurable registers 415 provide the means to pre-establish page pool locations, counts and mapping for the prefetch engine to service page faults and to allocate pages without direct operating system service. In another embodiment, the prefetch engine may have a local data buffer 411 referenced by microthreads, and a logical partition of the data buffer 411 may be allocated as a set of memory segment registers that may be used for translating addresses when the prefetch engine 402 is servicing page faults for operating system software.

A hierarchical page table with large blocks of small pages provides the granularity for "super pages" as well as the smaller granularity for maintaining attributes for memory management. The prefetch engine may also be enabled to handle interpretation and reaction to page table attributes and page fault event driven handling for the operating system.

In one embodiment, coherency may be maintained throughout the cache directory structure. For instance, when the prefetch engine 402 modifies data, the prefetch engine 402 will invalidate associated addresses higher in the memory hierarchy. When the prefetch engine 402 reads data that is cached outside a compute node, then that address will be coherently handled in the same manner as it would be for the main processor.

In one embodiment, a thread queue 410 is a linked list of executable threads that are stored locally to the prefetch engine 402. In one embodiment, three separate thread queues are defined and coexist within a common memory. For example, threads from low priority queue are given a limited amount of the available throughput when high priority threads are pending. The amount throughput allocation is programmable. Threads from high priority queue are executed at highest priority, but without a guarantee of execution order, as multiple threads may be in process at any given time. Threads from high priority sequential queue are executed at the highest priority with a guarantee of thread execution order. A new thread from this queue will not be started until the current thread is complete. In one embodiment, each independent thread list is organized as a linked list, with a "null" head node thread. The head node thread link pointer points to itself when an associated thread queue is empty, indicating that the NMP has nothing to do.

In one embodiment, the thread queues are maintained within the thread memory, which for example is high speed memory. This high speed memory is organized as the same width as a thread and with a depth equal to maximum thread count. An entire thread can be transferred between the memory and the prefetch engine, in both directions per clock cycle. A linked list is used to track unused thread entries as a "free" list. Therefore, in one embodiment, every thread memory entry can always be found in one of the active thread queues or the free list. All four lists can dynamically vary in length without wasting any entries. In one embodiment, four list heads exist initially: the three empty thread queue lists, which point to themselves and the "free" list, which points to the first entry in the memory. The first entry in turn points to the second entry, and so on until the last entry, which points to the free list head.

When a thread is enqueued, the first free list entry is allocated and used to store the new thread, and the new thread is linked into the selected thread queue, such that the head node points to the new thread, and the new thread points to the head node's previous link.

In one embodiment, all prefetch engine data operations may be carried out at the L3 cache 412. The prefetch engine can have as many outstanding main memory or L3 cache read accesses as there are threads. A separate data cache is used for holding the requested data operands when the requesting thread is not executing. This provides a means to hide the latency associated with the L3 and main memory by allowing other threads to execute during the fetch latencies.

The method and system of the present disclosure may be implemented on various processors running different operating systems. Depending on the system architecture, the updating or storing of the address translations may need to be performed differently. For instance, for an operating system such as AIX, the address mapping entries translated during a prefetch may be stored in hardware caches such as the TLB, SLB, ERAT or the like. In other systems, additional synchronization may need to be performed. For example, operating systems (OS) such as Linux may use different software structures for its address translation caches. In such cases, the updating or storing of the address translation may need to be performed at the hardware cache level as well as in the software structure used by the operating system.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for translation prefetching in a computer system, comprising:
   instructing a prefetch engine to prefetch data, the prefetch engine being a separate processor core from a main processor and logically located between a cache hierarchy of the main processor and main memory, the prefetch engine incorporated with a system memory controller of the main processor, the data for prefetching being data that is anticipated for future access by the main processor and prefetching of the data to be performed prior to when the data is needed;
   searching one or more cache translation entries for a mapping of a virtual address corresponding to the prefetch data to a physical address, the step of searching performed by the prefetch engine;
   the prefetch engine performing address mapping translation translating the virtual address of the data to be prefetched to a physical address without interrupting the main processor and without direct operating system service, if there is no virtual to physical address mapping in the one or more cache translation entries;
   prefetching the data, the step of prefetching performed by the prefetch engine; and
   storing the translated address mapping in a respective translation table of the main processor's cache hierarchy, if there is no virtual to physical address mapping found in the one or more cache translation entries, wherein the prefetch engine is enabled to store data directly to selected levels of the main processor's cache hierarchy and maintain cache coherency of the main processor's cache hierarchy.

2. The method of claim 1, wherein the step of storing the address mapping includes the prefetch engine storing the address mapping to L1 cache, L2 cache, or L3 cache, or combination thereof.

3. The method of claim 1, further including:
   generating an interrupt vector dedicated to unmapped prefetch data, when an address translation cache fault occurs.

4. The method of claim 1, further including:
   generating an interrupt vector dedicated to unmapped prefetch data, when an entry for prefetching is not mapped in TLB, SLB, ERAT, other translation caching mechanism, or combination thereof.

5. The method of claim 1, wherein the step of searching one or more cache translation entries further includes searching a second level address translation table.

6. The method of claim 1, further including:
   using software on the prefetch engine to determine data to prefetch.

7. The method of claim 1, further including:
   using hardware on the prefetch engine to determine data to prefetch.

8. The method of claim 1, wherein a compiler running on the main processor performs the step of instructing.

9. The method of claim 1, wherein an operating system running on the main processor performs the step of instructing.

10. The method of claim 1, wherein the step of searching includes searching TLB, SLB, ERAT, other translation caching mechanism or combination thereof for address mapping to prefetch data.

11. A system for translation prefetching, comprising:
    a main processor;
    a main memory;
    one or more cache memory;
    a prefetch engine logically located between a cache hierarchy of the main processor and the main memory and operable to receive instructions to prefetch data from the main memory, the prefetch engine incorporated with a system memory controller of the main processor, the data for prefetching being data that is anticipated for future access by the main processor and prefetching of the data to be performed prior to when the data is needed, the prefetch engine further operable to search one or more cache translation entries for a mapping of a virtual address corresponding to the prefetch data to a physical address, the prefetch engine further operable to perform address mapping translation translating the virtual address of the data to be prefetched to a physical address without interrupting the main processor and without direct operating system service, if there is no virtual to physical address mapping found in the one or more cache translation entries, the prefetch engine further operable to prefetch the data and store the translated address mapping in the one or more cache memory, if there is no virtual to physical address mapping found in the one or more cache translation entries, wherein the prefetch engine is enabled to store data directly to selected levels of the main processor's cache hierarchy and maintain cache coherency of the main processor's cache hierarchy.

12. The system of claim 11, further including:
    one or more second level cache translation entries operable to store address translations generated by the prefetch engine.

13. The system of claim 11, wherein the prefetch engine includes hardware to determine data to prefetch.

14. The system of claim 11, wherein the prefetch engine includes software to determine data to prefetch.

15. The system of claim 11, wherein the prefetch engine is located on one of: on a main processor chip where the main processor resides and outside the main processor chip.

16. The system of claim 11, wherein the address translation includes TLB, SLB, ERAT, or other translation caching mechanism, or combination thereof.

17. The system of claim 11, wherein the main processor is operable to instruct the prefetch engine.

18. A system for translation prefetching, comprising:
    a main processor;
    a prefetch engine logically located between a cache hierarchy of the main processor and a main memory, the prefetch engine incorporated with a system memory controller of the main processor, and operable to at least carry out one or more instructions to prefetch data for the main processor to use, the data for prefetching being data that is anticipated for future access by the main processor and prefetching of the data to be performed prior to when the data is needed, the prefetch engine further operable to at least tag a prefetch request for unmapped data to be prefetched that does not have a virtual address to a physical address mapping cached in an address translation cache; and an interrupt vector dedicated to unmapped prefetch requests, wherein the interrupt vector is generated when a prefetch is to unmapped data, and in response to the interrupt vector, unmapped data's address is translated and the unmapped data is prefetched into a cache location without interrupting the main processor and without direct operating system service, and the unmapped data's address translation is stored in a respective cache translation buffer, wherein the prefetch engine is enabled to store data directly to selected levels of the main processor's cache hierarchy and maintain cache coherency of the main processor's cache hierarchy;

a first level translation look aside table and a second level translation look aside table located in the main processor's cache hierarchy wherein the first level translation look aside table is stored in smaller and higher speed memory than the second level translation look aside table, and wherein prefetch engine's pre-load page table entries are stored in the second level translation look aside table.

19. The system of claim 18, further including:

a second level cache translation buffer, wherein the unmapped data's address translation is stored in the second level cache translation buffer.

20. The system of claim 18, wherein the prefetch engine performs the address translation for the unmapped data.

\* \* \* \* \*